(12) United States Patent
Dower et al.

(10) Patent No.: US 7,307,219 B1
(45) Date of Patent: *Dec. 11, 2007

(54) CLOSURE HOUSING FOR SEALING

(75) Inventors: William V. Dower, Austin, TX (US); Kenneth D. Rebers, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/422,658

(22) Filed: Jun. 7, 2006

(51) Int. Cl.
*H01R 4/00* (2006.01)

(52) U.S. Cl. .................... 174/84 R; 174/92
(58) Field of Classification Search .............. 174/74 R, 174/75 R, 76, 77 R, 78, 84 R, 84 S, 88 R, 174/92, 93, 94 R
See application file for complete search history.

(56) References Cited

U.S. PATENT DOCUMENTS

| | | | |
|---|---|---|---|
| 3,515,798 A | | 6/1970 | Sievert |
| 3,545,773 A | * | 12/1970 | Smith ................ 277/314 |
| 3,676,387 A | | 7/1972 | Lindlof |
| 3,678,174 A | | 7/1972 | Ganzhorn |
| 3,827,999 A | | 8/1974 | Crossland |
| 3,935,373 A | * | 1/1976 | Smith et al. ............ 174/77 R |
| 3,992,569 A | * | 11/1976 | Hankins et al. ............ 174/92 |
| 4,256,920 A | * | 3/1981 | Ayres et al. ............ 174/667 |
| 4,308,416 A | * | 12/1981 | Herman et al. ........... 174/23 C |
| 4,343,844 A | | 8/1982 | Thayer et al. |
| 4,464,425 A | | 8/1984 | Voigt et al. |
| 4,504,699 A | | 3/1985 | Dones et al. |
| 4,550,056 A | * | 10/1985 | Pickwell et al. ............ 428/391 |
| 4,569,868 A | | 2/1986 | De Blauwe et al. |
| 4,742,184 A | | 5/1988 | Courty et al. |
| 4,798,853 A | | 1/1989 | Handlin, Jr. |
| 4,849,580 A | | 7/1989 | Reuter |
| 4,857,563 A | | 8/1989 | Croft et al. |
| 4,859,809 A | | 8/1989 | Jervis |
| 4,877,943 A | | 10/1989 | Oiwa |
| 4,902,855 A | | 2/1990 | Smith |
| 4,915,990 A | | 4/1990 | Chang |
| 4,942,270 A | * | 7/1990 | Gamarra ................ 174/93 |

(Continued)

FOREIGN PATENT DOCUMENTS

DE 1813201 7/1970

(Continued)

OTHER PUBLICATIONS

Product Literature: "Black-Jack™ and 50-Pair Cable Closures with Water-Block Sealing System for Direct Buried Spliced Cables," *Preformed Line Products (PLP)*, (2000), 2 pages.

(Continued)

*Primary Examiner*—William H. Mayo, III
(74) *Attorney, Agent, or Firm*—Gregg H. Rosenblatt

(57) ABSTRACT

A closure housing includes several housings. At least one of the housings is a concave housing with an open face. At least one layer, such as for example an elastomeric film or conformable sealant, is mounted on a circumferential perimeter portion of the concave housings across the open face of each of the concave housings. At least one layer, such as an elastomeric film, is adapted to interface one or more cables when the cables are interposed between the housings.

43 Claims, 7 Drawing Sheets

U.S. PATENT DOCUMENTS

| | | | |
|---|---|---|---|
| 4,943,685 A | | 7/1990 | Reynaert |
| 4,943,985 A | * | 7/1990 | Gherardi ..................... 375/362 |
| 4,990,380 A | | 2/1991 | Jensen et al. |
| 5,313,019 A | * | 5/1994 | Brusselmans et al. ........ 174/93 |
| 5,439,031 A | | 8/1995 | Steele et al. |
| 5,574,257 A | * | 11/1996 | Brauer et al. .................. 174/76 |
| 5,606,148 A | * | 2/1997 | Escherich et al. ........ 174/88 R |
| 5,688,601 A | * | 11/1997 | Usifer et al. ................ 428/457 |
| 5,753,861 A | | 5/1998 | Hansen et al. |
| 5,883,333 A | * | 3/1999 | Wambeke et al. ............. 174/92 |
| 6,103,317 A | * | 8/2000 | Asai et al. .................. 427/512 |
| 6,103,975 A | | 8/2000 | Krabs et al. |
| 6,169,160 B1 | * | 1/2001 | MacQueen et al. ......... 528/310 |
| 6,169,250 B1 | | 1/2001 | Bolcato |
| 6,248,953 B1 | * | 6/2001 | Miller ...................... 174/74 R |
| 6,284,976 B1 | * | 9/2001 | Pulido et al. ............. 174/77 R |
| 6,359,226 B1 | | 3/2002 | Biddell et al. |
| 6,403,889 B1 | | 6/2002 | Mehan et al. |
| 6,407,338 B1 | * | 6/2002 | Smith .......................... 174/92 |
| 6,730,847 B1 | | 5/2004 | Fitzgerald et al. |
| 7,215,865 B2 | | 5/2007 | Bellekens et al. |
| 2004/0006557 A1 | * | 1/2004 | Baker et al. .................. 174/36 |
| 2006/0037687 A1 | | 2/2006 | Buekers et al. |

FOREIGN PATENT DOCUMENTS

| | | |
|---|---|---|
| EP | 0 530 952 A1 | 3/1993 |
| EP | 0 750 381 A1 | 12/1996 |
| EP | 0 780 949 A1 | 6/1997 |

OTHER PUBLICATIONS

Product Literature: "Ranger Serviseal® Closure, Super Serviseal® Closure," *Preformed Line Products* (*PLP*), (2002), 2 pages.

* cited by examiner

CLOSURE HOUSING FOR SEALING

BACKGROUND

Closure housings have been used in the telecommunications industry and electrical utilities industry for the purpose of protecting cables from outside environmental elements. Such closure housings can be installed above-ground as aerial closures, buried underground, placed in hand-holes, or mounted on poles. The outer perimeter of the closure housing provides mechanical protection from environmental elements such as rains, floods, winds, and snow, and other water or dirt particles that may harm the splice or connector.

SUMMARY

Embodiments of the invention, for example, can advantageously include an apparatus having several housings. At least one of the housings can include a concave housing with an open face. One or more elastomeric films can be mounted on a circumferential perimeter portion of the concave housings across the open face of each of the concave housings. The elastomeric films are adapted to interface one or more cables when the cables are interposed between the housings to seal the cables from environmental conditions.

Also, for example, embodiments of the invention can advantageously include an alternative apparatus having several housings. At least one of the housings can include a concave housing with an open face. One or more flexible layers can be mounted on a circumferential perimeter portion of the concave housings across the open face of each of the concave housings. The flexible layers are adapted to interface one or more cables when the cables are interposed between the housings to seal the cables from environmental conditions.

Also, for example, embodiments of the invention can advantageously include an alternative apparatus having several housings. At least one of the housings can include a concave housing with an open face. One or more flexible layers can be mounted on a circumferential perimeter portion of the concave housings across the open face of each of the concave housings. One or more conformable sealants can cover a surface portion of each of the flexible layers. The conformable sealants are adapted to interface one or more cables when the cables are interposed between the housings to seal the cables from environmental conditions.

Also, for example, embodiments of the invention can advantageously include an alternative apparatus having two or more concave housings that are facing mated housings. Each of the housings can include an open face that faces and mates with the open face of an adjacent housing. Two or more flexible layers can each be mounted on a circumferential perimeter portion of the concave housings across the open face of each of the concave housings. Two or more elastomeric films can each cover a surface portion of each of the flexible layers. One or more cables can be secured within the housings. A first portion of each of the cables can be interposed between the elastomeric films and facing housings to seal the cables from environmental conditions, and a second portion of each of the cables can extend outside of the elastomeric films and the facing housings.

In operation, the invention advantageously provides improved protection and watertight sealing of one or more cables and/or joining components from harmful environmental conditions in the communications industry (such as telecommunications industry), utilities industry (such as electrical utilities industry), or other industries involving the distribution of cables and/or the transmission of optical light or electricity, seeking improved solutions regarding sealing solutions, re-enterability solutions, pressure condition solutions, space condition solutions, and weight condition solutions advantageously provided by the invention.

In one aspect of the invention, the inclusion of the elastomeric film, flexible layer, and/or conformable sealant, in combination with the hollow nature of the concave housing, advantageously provides a solution for a closure housing that offers improved sealing, while at the same time providing a closure housing that is re-enterable to an extent not provided in existing closure housings.

Further, in another aspect, the invention advantageously provides improved mechanical cable stress and strain relief based on pressure changes during periods of operation. The relatively soft surface of the layers mounted to the housings can deform to accommodate pressure changes, without placing undue stress on the outer perimeter of the housings. The compliance of the deformable layers mounted to the housings allows for significant changes in the shape of the closure while maintaining a watertight seal. Because the volume protected from water is only marginally larger than the volume of the splice, and generally significantly smaller than the entire volume of the interior of the closure housing, the influence of pressure changes are advantageously minimized, as compared to rendering the entire volume of the closure housing watertight.

Further, the hollow nature of the concave housing advantageously provides increased room or space for the displacement of large cables inside the closure housing. Further, the hollow nature of the concave housing advantageously provides a lightweight solution for a closure housing, and the decrease in weight importantly allows for easier installation and transport, as well as a reduction in cost associated with the manufacture of such a closure housing.

In the past, closure housings have demonstrated problems that have not as yet been overcome in the art. Prior closure housings, and the sealing mechanism thereof, have demonstrated significant changes in shape with changing temperatures. Such changes in shape have caused loss of the seal and failure of the water and dirt particle barrier properties important to the sealing function. Prior closure housings also have presented the problem of not being easily re-enterable, which is significant in cases where cable repair or splice repair is necessary. The excess materials and heavier weight associated with prior closure housings contributed to increased waste and more difficult transport.

DETAILED DESCRIPTION

Figure 1A:
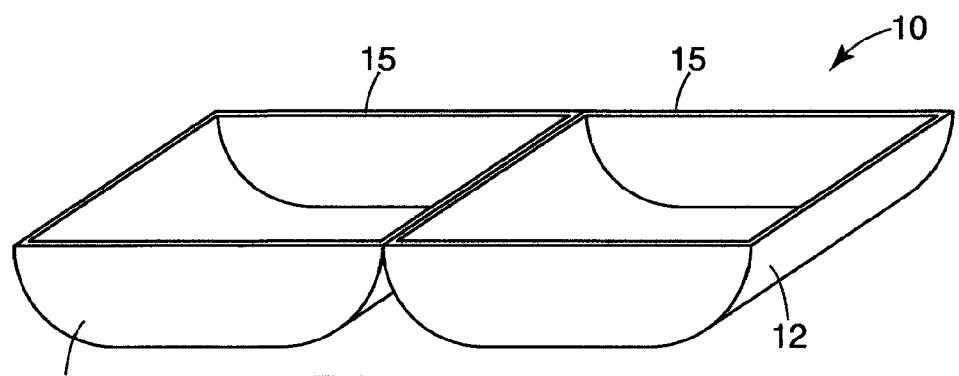
FIG. 1a is an isometric view of a housing in an open position, showing the hollow concave interior of the housing.

As shown in the Figures, the invention includes a plurality of housings 12, at least one of which comprises a concave housing 12 with an open face. Embodiments of the invention can include, for example, facing mated housings 12, where two or more of the plurality of housings 12 are concave housings 12 with an open face, and where the open face of one of the concave housings 12 faces and mates with the open face of an adjacent housing 12. Embodiments can also include one or more hinges, such as a living hinge, or other fasteners positioned at circumferential perimeter 15 portions of each of the housings 12 to join each housing 12 with an adjacent housing 12. Also, for example, embodiments can include clips, bolts, or other fasteners used to maintain the entire closure housing 10 in the closed position or hold the elastomeric film 20 in a sealed configuration.

The housings 12 can be made by various processes, for example, injection molding, blow molding, spin molding, extrusion molding, vacuum molding, rotational molding, and thermal forming. Embodiments of the housings 12 can be made from various materials, for example, aluminum, steel, metal alloys, and plastics, particularly thermoplastics, such as polyolefins, polyamides, polycarbonates, polyesters, polyvinyls, and other polymeric materials. The plastic housing 12 embodiments can use a metal reinforcing strip for increased stability and strength.

As shown in FIG. 1a, the housings 12 can be hollow and concave. The concave housings 12 can include a large concavity or a small concavity, and can include, for example, a concavity such as within a hollow rectangular box having an open face, or a concavity such as within a hollow semi-circular sphere having an open face. The closure can include, for example, embodiments where the volume between an inside wall of the concave housing 12 and the elastomeric film 20 is substantially free of filler material.

Figure 1B:
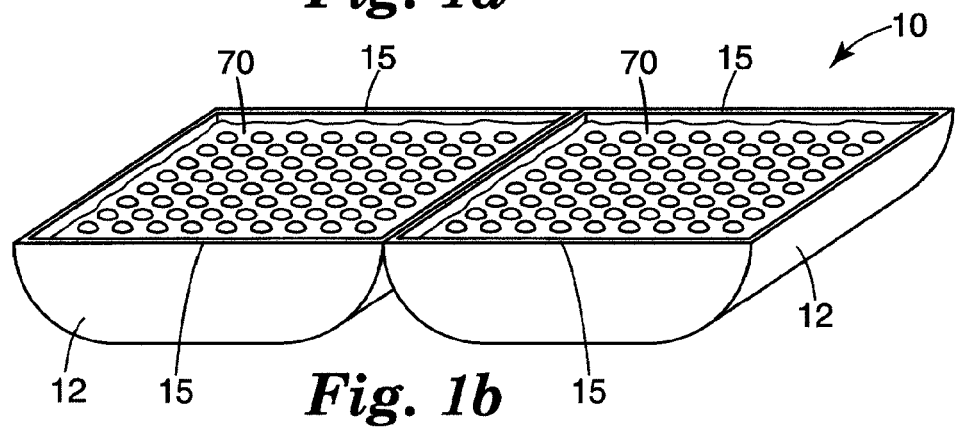
FIG. 1b is an isometric view of a housing in an open position, showing gas bladders filling the concave interior of the housing.
Figure 2:
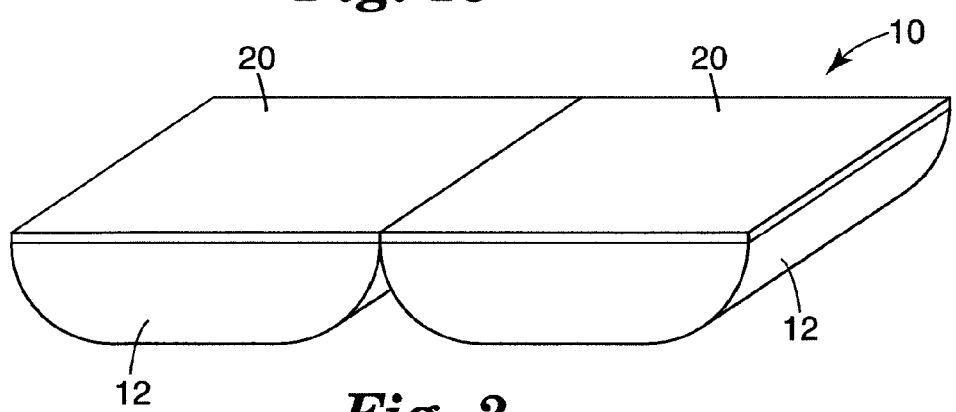
FIG. 2 is an isometric view of a closure housing in an open position, including a layer across the open face of the housing, according to an embodiment of the invention.
Figure 3:
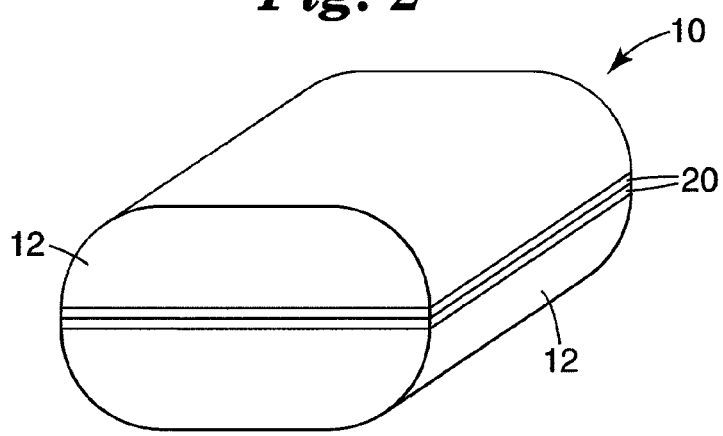
FIG. 3 is an isometric view of the closure housing of FIG. 2 in a closed position according to an embodiment of the invention.
Figure 4:
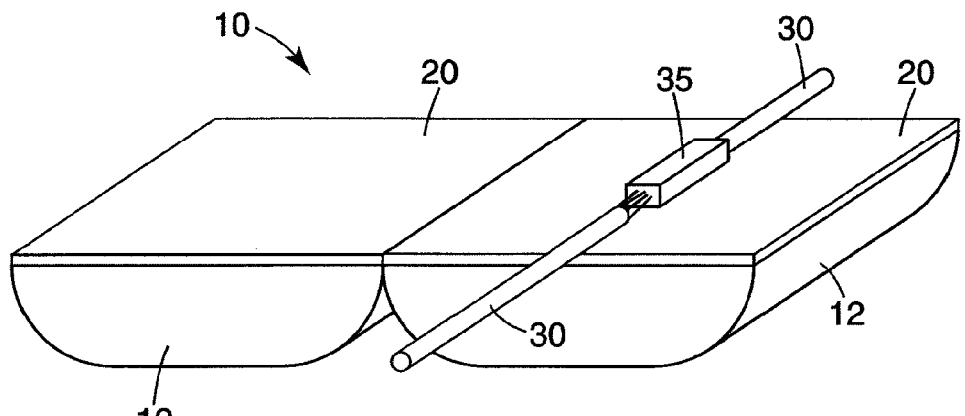
FIG. 4 is an isometric view of the closure housing of FIG. 2 including one or more cables according to an embodiment of the invention.
Figure 7:
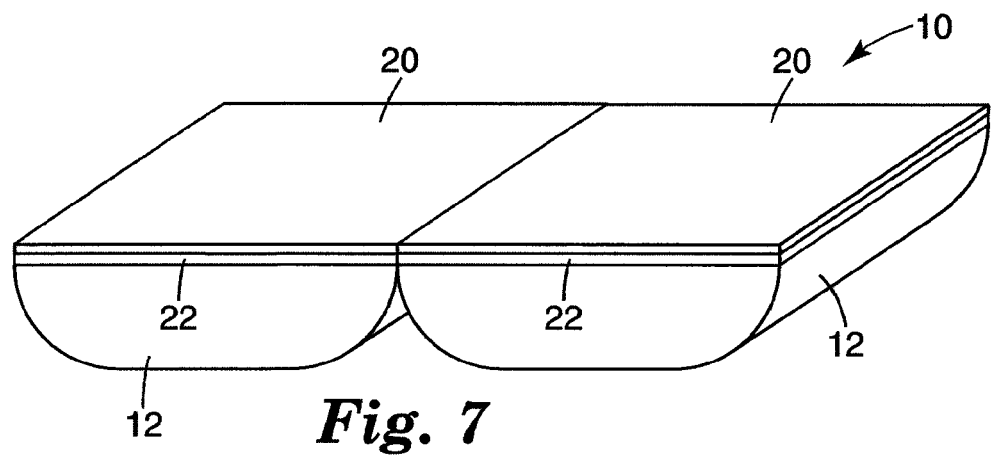
FIG. 7 is an isometric view of a closure housing in an open position, including layers across the open face of the housing, according to an embodiment of the invention.
Figure 8:
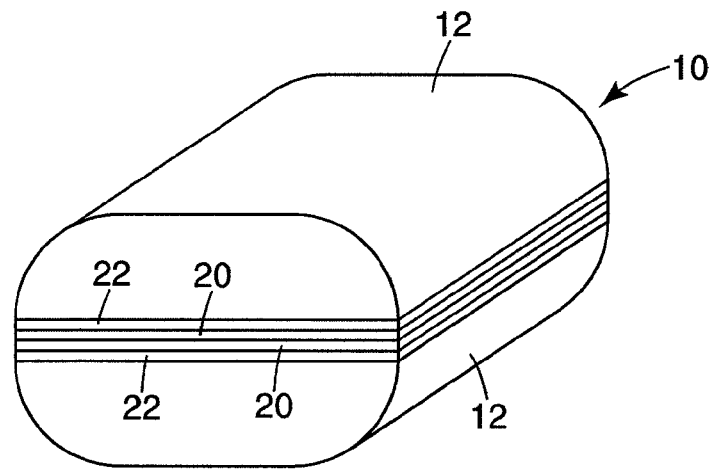
FIG. 8 is an isometric view of the closure housing of FIG. 7 in a closed position according to an embodiment of the invention.
Figure 9:
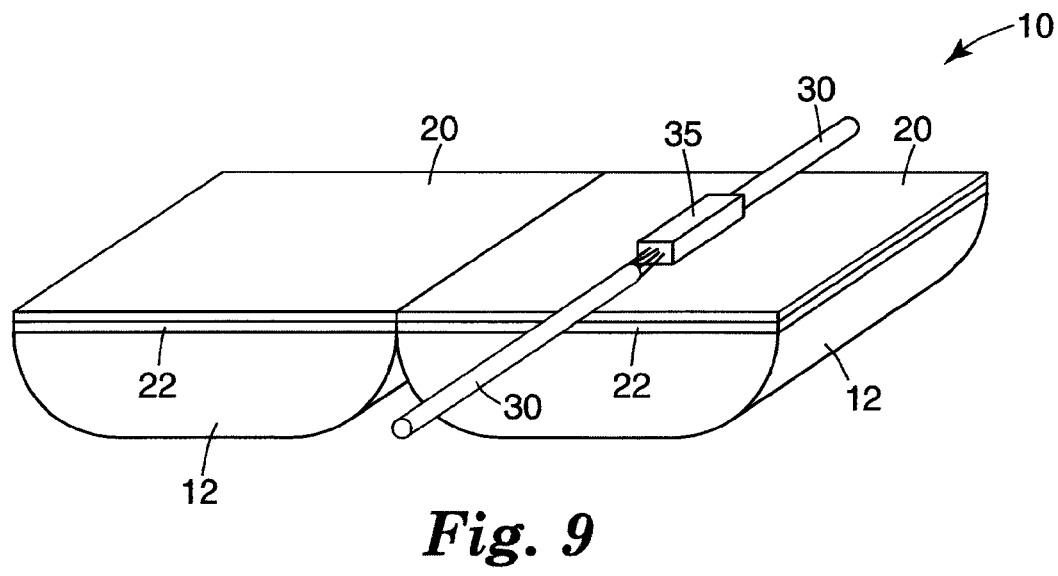
FIG. 9 is an isometric view of the closure housing of FIG. 7 in an open position including one or more cables according to an embodiment of the invention.

As shown in FIG. 1a and implemented in FIG. 7, for example, the closure can include embodiments where the volume between an inside wall of the concave housing 12 and the flexible layer 22 is substantially free of filler material. Alternatively, as shown in FIG. 1b the closure can include embodiments, for example, where compressible gas bladders 70 are positioned in the concave cavity of the concave housing 12. Also, the closure can include embodiments where rupturable gas bladders 70 are positioned in the concave cavity of the concave housing 12. The material used to make gas bladders 70 is usually polyethylene. The diameter, height, and pressure of the gas bladders 70 may vary. The gas bladders 70, for example, can be "bubble wrap." The gas bladders 70, for example, can include nitrogen filled bladders 70. The gas bladders 70 advantageously apply a relatively consistent pressure to the cables 30 and/or joining component 35 inside the closure housing 10. Also, embodiments of the gas bladders 70 can be pre-assembled with a film on the top and/or bottom of the gas bladder 70.

Figure 14:
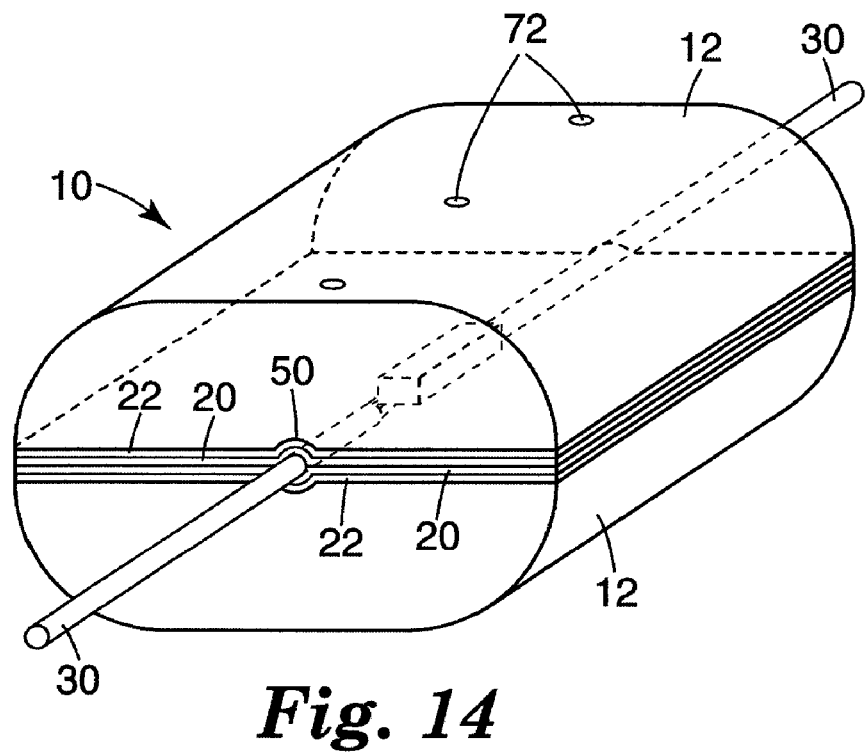
FIG. 14 is an isometric view of a closure housing having arcuate channels in a closed position including one or more cables according to an embodiment of the invention.

Also, as shown in FIG. 14, the closure can include embodiments where a portion of the wall of the concave housing 12 comprises one or more orifices 72, to let air penetrate within the volume inside the concave housing 12.

As shown in the Figures, embodiments of the housing 12 can, for example, include one or more flexible layers 22 mounted on a circumferential perimeter 15 portion of the concave housings 12 across the open face of each of the concave housings 12. Alternatively, for example, the housing 12 can include one or more elastomeric films 20 or conformable sealants 20 mounted on a circumferential perimeter 15 portion of the concave housings 12 across the open face of each of the concave housings 12.

For example, as shown in FIGS. 2-6, the flexible layer 22, or alternatively the elastomeric film 20, can be mounted to the housing 12 by aligning one or more elastomeric films 20 to one or more of the concave housings 12 in a substantially planar configuration across a circumferential perimeter 15 of the open face of each concave housing 12, and securing the elastomeric films 20 on the concave housings 12.

Also, for example, as shown in FIGS. 7-14, the housing 12 can include both a flexible layer 22 and an elastomeric film 20 mounted thereon, in which case each of the one or more elastomeric films 20 covers a surface portion of each of the flexible layers 22. Also, for example, as shown in FIGS. 7-14, the housing 12 can include both a flexible layer 22 and a conformable sealant 20 mounted thereon, in which case the conformable sealant 20 covers a surface portion of each of the flexible layers 22. Also, for example, the housing 12 can include both an elastomeric film and a conformable sealant mounted thereon, in which case the conformable sealant covers a surface portion of each of the elastomeric film.

Also, for example, the housing 12 can include two flexible layers and an elastomeric film mounted thereon. One example of such an embodiment provides a first flexible layer in the form of a rubber material mounted to the concave housing 12. The second flexible layer is in the form of a woven or non-woven web of strands covering the first flexible layer. Finally, an elastomeric film also covers the first flexible layer while at the same time co-continuously interpenetrating the second flexible layer web of strands.

Also, for example, the housing 12 can include one elastomeric film layer mounted thereon across the open face on the circumferential perimeter 15 of the housing 12, while at the same time featuring a cable pre-wrapped with a separate elastomeric film that is housed within the housing 12. This embodiment offers the advantages of having multiple points of sealing. The elastomeric film that wraps the cable acts as a first point of sealing, and the elastomeric film layer 20 that is mounted to the housing acts as a second point of sealing.

Also, for example, the housing 12 can include two flexible layers and a conformable sealant mounted thereon. One example of such an embodiment provides a first flexible layer in the form of a rubber material mounted to the concave housing 12. The second flexible layer is in the form of a porous substrate covering the first flexible layer. Finally, a conformable sealant also covers the first flexible layer while at the same time co-continuously interpenetrating the second flexible layer porous substrate.

In accordance with the invention, the flexible layer can be any layer that is flexible, the elastomeric film can be any layer exhibiting elastomeric properties, and the conformable sealant can be any material capable of conforming itself to an adjacent structure. For example, a rubber material can be both a flexible layer and an elastomeric film. Also, for example, a polymeric gel material can be a flexible layer, an elastomeric film, and a conformable sealant as well. Also, for example, a grease material can be a conformable sealant.

The elastomeric film 20 typically includes at least a polymer and an oil portion. Embodiments of the elastomeric film 20 can include, for example, a polymeric thermoplastic hydrophobic gel sealant including at least a portion of oil.

The properties of the polymer which make it most suited for this application are good compatibility with the oil, and rubber-like morphology, meaning flexible chains with some significant molecular flexibility between cross-linking sites. Examples of polymers that are useful can include oil-filled silicones, polyurethanes, polyesters, polyepoxys, polyacrylates, polyolefins, polysiloxanes, polybutadienes (including polyisoprenes), and hydrogenated polybutadienes and polyisoprenes, as well as copolymers, including block copolymers and graft copolymers. The blocks of the block copolymers may include the above polymers and poly(monoalkenylarenes) including polystyrene. Examples of these bock copolymers can include particularly SEBS (Styrene, ethylene-butylene, Styrene), SEPS (Styrene, ethylene-propylene, Styrene), similar Styrene-rubber-Styrene polymers, di-block, tri-block, graft- and star-block copolymers, and block copolymers with blocks which are non-homogeneous. Closed-cell foamed materials, and those incorporating microbubbles or other soft (or hard) fillers can also be included.

Embodiments of the invention can feature the elastomeric film 20 as a thermoplastic or alternatively as being cured in place. In the form of thermal cures, room temperature vulcanizable cures (RTV cures), UV-initiated cures, e-beam cures, radiation initiated cures, and cures from exposure to air and/or moisture. The elastomeric film 20 typically has greater cohesion than adhesion.

The portion of oil in the elastomeric film 20 can be, for example, in the range of about 50% to about 98% of the elastomeric film 20, or more particularly, in the range of about 85% to about 98% of the elastomeric film 20. Also, for example, embodiments of the elastomeric film 20 can include filler particles, such as polymeric spheres or glass microspheres. One example of such filler particles is deformable bubbles, where the elastomeric film 20 is formed by foaming and adding discrete bubbles. The added bubbles can be polymeric or glass microbubbles. Addition of such filler particles or bubbles allows the elastomeric film 20 to demonstrate volume compliance which will further allow conformity of the elastomeric film 20 in operation.

Embodiments of the oil can include, for example, an extender such as synthetic oils, vegetable oils, silicones, esters, hydrocarbon oils, including particularly naphthinic oils and paraffinic oils and blends, and also possibly some small percentage of aromatic oils. Some compositions within the elastomeric film 20 are intermediate between the polymer and the oil. For example, the elastomeric film 20 can include a liquid rubber which may not become part of the gel-forming polymer network. Examples of such a liquid rubber can include polybutene of moderate molecular weight, and low molecular weight EPR (Ethylene Propylene Rubber). Adding a liquid rubber to the polymer and oil can tailor the characteristics of the sealant by increasing the tack, for example. Takifiers, antioxidants, colorants, UV stabilizers, and others can be added.

Typically, the oil is advantageously hydrophobic to keep water out. Also, typically, the oil advantageously reduces the amount of chain entanglements and the number of crosslinks per volume, thereby making the material softer in the gel form. Also, typically, the oil advantageously reduces the viscosity of either the precursor (before curing) or the melted thermoplastic. Also, typically, the oil is relatively inexpensive thereby reducing the cost of the total formulation.

As mentioned previously, a conformable sealant 20 can be used with the housing 12 in various embodiments. Embodiments of the conformable sealant 20 provide the required mechanical properties of low shear yield point, and higher adhesion than cohesion. Embodiments of the conformable sealant 20 can include, for example, a thickener cooperating with at least a portion of oil.

The thickener can include, for example, an organic polymeric composition. The organic polymeric composition can include, for example, polymers including polyurethanes, polyesters, polyepoxys, polyacrylates, polyolefins, polysiloxanes, polybutadienes (including polyisoprenes) and hydrogenated polybutadienes and polyisoprenes, as well as block copolymers. The blocks of the block copolymers can include, for example, the above polymers and poly(monoalkenylarenes) including polystyrene. These bock copolymers can include particularly SEB (Styrene, ethylene-butylene), SEP (Styrene, ethylene-propylene), SEBS (Styrene, ethylene-butylene, Styrene), SEPS (Styrene, ethylene-propylene, Styrene), similar Styrene-rubber polymers, di-block, graft- and star-block copolymers, and block copolymers with blocks which are non-homogeneous.

Also, for example, the thickener can include an inorganic sol composition. The inorganic sol composition can include, for example, alumina, silica, or clay. Also, for example, the thickener can include a soap composition. The soap composition can include, for example, metal complex soaps, aluminum complex soaps, lithium complex soaps, or calcium complex soaps. Also, for example, the thickener can be a greases, waxes (including polyethylene and polypropylene waxes), or viscoelastic polymeric hydrophobic composition including at least a portion of oil. The conformable sealant 20 can also be prepared from shearing gels, for example, as understood by those skilled in the art.

The portion of oil in the conformable sealant 20 can be, for example, in the range of about 50% to about 98% of the conformable sealant 20, or more particularly, in the range of about 70% to about 98% of the conformable sealant 20. For example, the oil can be a hydrocarbon oil, including particularly naphthinic oils and paraffinic oils and blends, and also possibly aromatic oils. Also, for example, embodiments of the conformable sealant 20 can include filler particles, such as polymeric spheres or glass microspheres. One example of such filler particles is deformable bubbles, where the conformable sealant 20 is formed by foaming or by adding discrete bubbles. The added bubbles can be polymeric or glass microbubbles. Addition of such filler particles or bubbles allows the conformable sealant 20 to demonstrate volume compliance which will further allow conformity of the conformable sealant 20 in operation.

As mentioned previously, a flexible layer 22 can be used with the housing 12 in various embodiments. The flexible layer 22 can include, for example, a rubber, elastomer, or other elastic material. The flexible layer 22 can be used alone by itself, or alternatively the flexible layer 22 can be used in cooperation with the elastomeric film 20 and/or conformable sealant 20. An adhesive may be applied between the flexible layer 22 and the elastomeric film 20 or conformable sealant 20 in those cases in which multiple layers are utilized with the housing 12. Additionally, the flexible layer 22 can include, for example, a woven web of strands or a non-woven web of strands, capable of co-continuously interpenetrating with the elastomeric film 20. The flexible layer 22 can also include, for example, a porous substrate capable of co-continuously interpenetrating with the conformable sealant 20. The flexible layer 22 can also include, for example, open-cell foams and open geometry webs. The flexible layer 22 can be capable of deforming to seal a solid object such as a cable 30.

Figure 18:
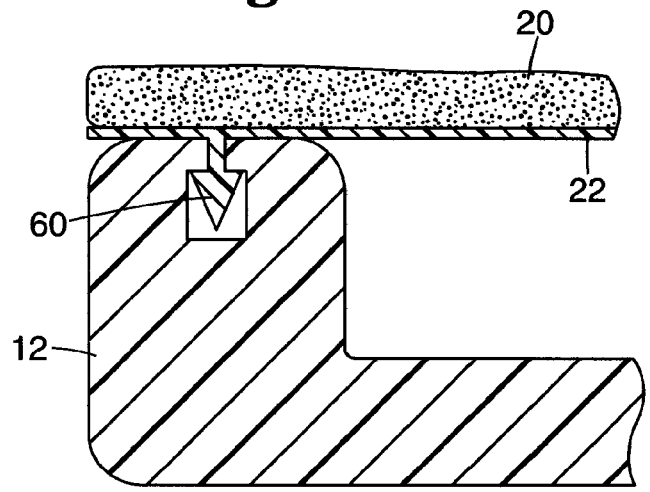
FIG. 18 is a sectional view of a housing receiving a barb to secure a layer thereto according to an embodiment of the invention.
Figure 19:
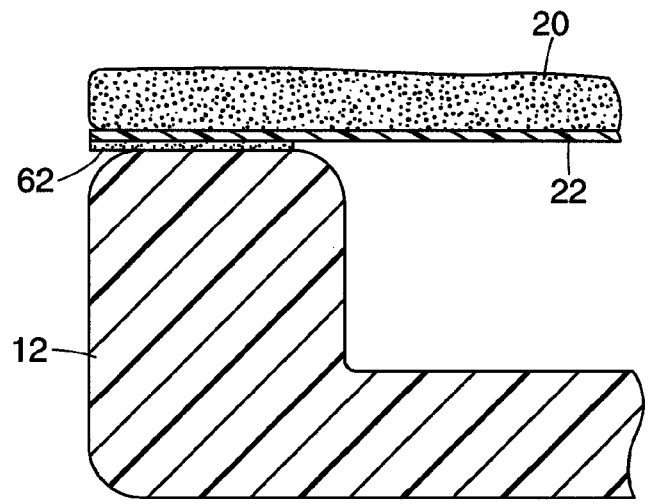
FIG. 19 is a sectional view of a housing having an adhesive thereon to secure a layer thereto according to an embodiment of the invention.

As shown in FIGS. 18 and 19, the flexible layer 22 can be mounted to the housing 12 in various ways. For example, a fastener can be inserted through the elastomeric film 20 and the flexible layer 22 when the elastomeric film 20 and the flexible layer 22 are mounted to the housing 12. Such fasteners can include screws, bolts, self-tapping screws, 'christmas tree' fasteners, trim panel retainers, or other types of fasteners. Also, for example, an adhesive 62 can be used to mount the flexible layer 22 to the housing 12. Also, for example, embodiments can include a barb 60 extending from the flexible layer 22, and a slot defined in the housing 12, where the barb 60 is capable of being inserted through the slot. In such an example, it would be difficult to remove the barb 60 from the slot in the housing 12 after the barb 60 was inserted therethrough. Other methods of bonding can be envisioned, including thermal and thermal compression techniques.

Figure 5:
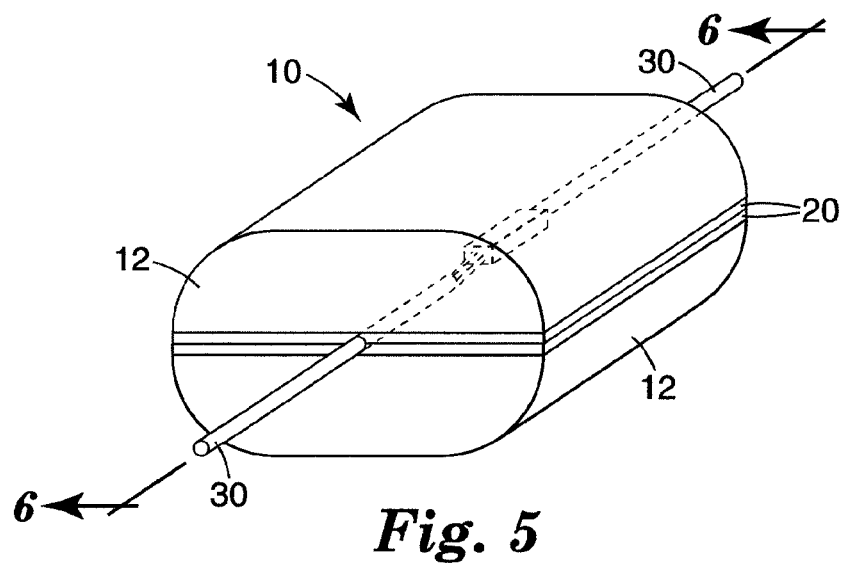
FIG. 5 is an isometric view of the closure housing of FIG. 3 including one or more cables according to an embodiment of the invention.
Figure 10:
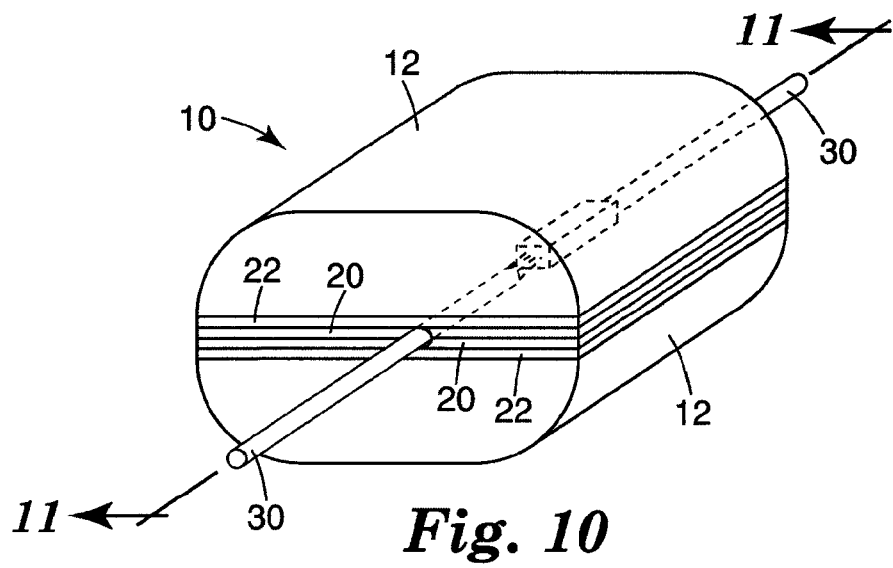
FIG. 10 is an isometric view of the closure housing of FIG. 8 in a closed position including one or more cables according to an embodiment of the invention.

As shown in FIGS. 5, 10, and 14, the housing 12 can be used to seal the cables 30 and/or joining components 35 from water, particles, or other environmental elements outside the closure. A first portion of each of the cables 30, for example, can be interposed between the facing housings 12 and layers mounted to the housings 12. A second portion of each of the cables 30, for example, can extend outside of the facing housings 12 and layers mounted to the housings 12. Embodiments of the cable 30 can include, for example, a copper or aluminum wire cable 30, a preterminated cable 30, a glass optical fiber cable 30, a polymer optical fiber cable 30, a hybrid wire and fiber optic cable 30, or any other type of cable 30 that conducts light and/or electricity.

The housing 12 can advantageously operate to seal a single cable 30 or a series of cables 30 from water or other environmental elements. Embodiments can include, for example, a cable 30 or series of cables 30 joined to another cable 30 or series of cables 30 within the closure via a joining component 35, or a single cable 30 run all the way through the closure as a single unit, or, for example, both can occur within a single closure. Each of the cables 30 passing inside or through the closure is configured along a direction substantially parallel to the plane of the open face of the concave housing 12. The circumferential perimeter portions are joined by one or more fasteners at opposite sides of the open face to retain the closure housing 10 in the closed or shut position with the cables 30 sealed therein.

In some embodiments that do not include a joining component 35 joining two or more cables 30, a single cable 30 running through the closure may need to be sealed from water or other environmental elements after a cable repair material is applied for repair or maintenance of the cable 30. In such a case where a cable repair material surrounds one or more cables 30 within the closure, the worn or torn portion of the cable 30 that contains the cable repair material interfaces a portion of at least one of the elastomeric films 20, for example, after being interposed between the facing housings 12 of the closure. Embodiments of the cable repair material applied to the cable 30 can include, for example, tapes, mastics, foams, epoxys, encapsulants, shield bond connectors, braid, #6 ground wire, and other types of cable repair materials.

If a joining component 35 is used to join two or more cables 30, the housing 12 advantageously operates to seal not only each cable 30 run inside or through the closure, but also to seal the joining component 35 inside the closure from water or other environmental elements. Embodiments of the joining component 35 can include, for example, a splice or other joining component 35 having connectors therein (including discrete connectors, modular connectors, tap connectors, preterminated connector, or other connectors). Also, for example, in some applications the joining component 35 can include a termination, where the cable 30 is joined with a terminal piece of electrical or fiber optic equipment.

The joining component 35 can interface a portion of each layer mounted to each housing 12 and can thereby be interposed between the layers mounted to the housings 12. For example, the joining component 35 can interface a portion of the elastomeric film 20 mounted on each of the housings 12, thereby being interposed between the elastomeric films 20 mounted to the housings 12. Embodiments including any or all of the flexible layer 22, elastomeric film 20, and/or conformable sealant 20 advantageously operate to prevent external particles and fluids from accessing the portion of the one or more cables 30 interposed between the flexible layers 22, elastomeric films 20, and/or conformable sealants 20.

Figure 15A:
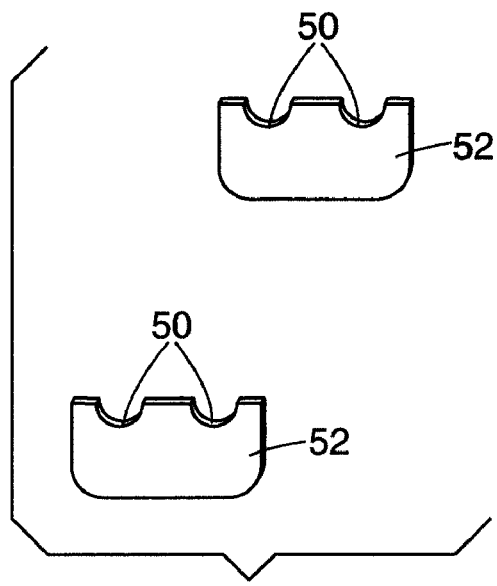
FIG. 15a is an isometric view of removable walls having arcuate channels according to an embodiment of the invention.
Figure 15B:
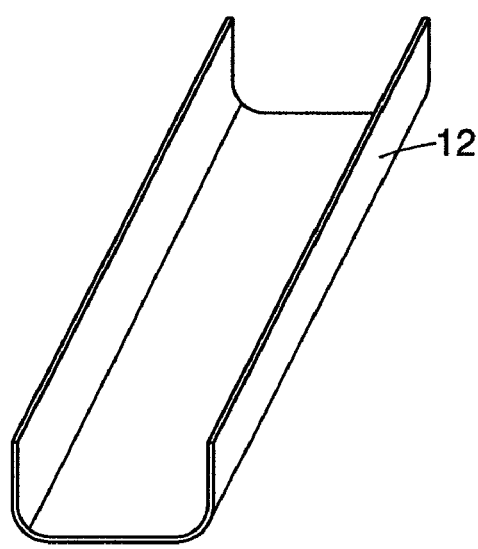
FIG. 15b is an isometric view of a housing prior to installation of the removable walls of FIG. 15a, according to an embodiment of the invention.
Figure 17:
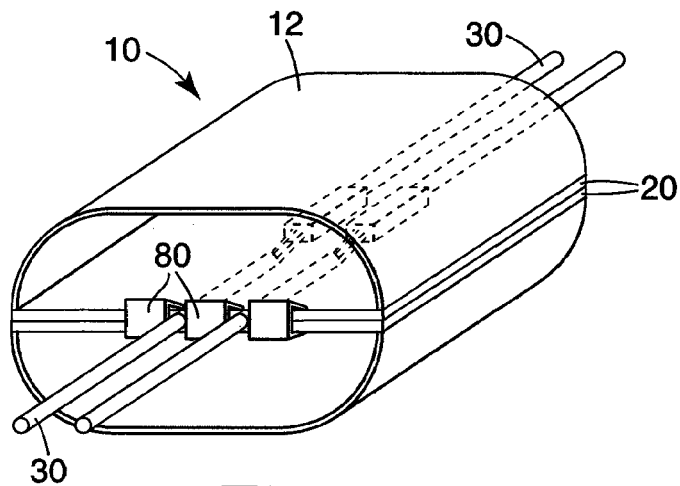
FIG. 17 is an isometric view of a closure housing including one or more cables according to an embodiment of the invention.

In some embodiments, as shown in FIG. 17, if more than one cable 30 is desired to enter the closure housing on either side, and if the several cables 20 are too close together, then there may be a small space which exists between the cables 30 of which the elastomeric film 20 does not fill the volume. In such a case, the concave housing 12 would not include side walls 52 (neither fixed nor removable) or adapters 54, such as shown in FIG. 15b. Because the side walls are not included in the concave housing 12, a clip, clamp, or other fastener 80 or series of clips, clamps, or fasteners 80 can be used to clamp the facing layers of elastomeric film 20 to each other at the portion between the cables 30, thereby closing the volume of space between the cables 30 and sealing the cables 30 from water, dirt, or other environmental particles.

Figure 15C:
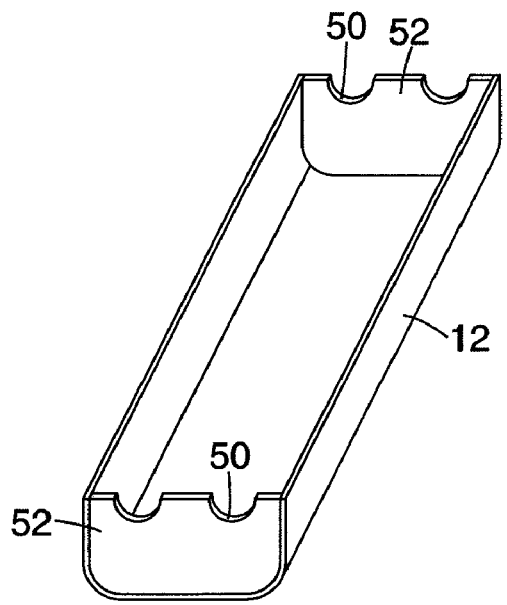
FIG. 15c is an isometric view of a housing after installation of the removable walls of FIG. 15a, according to an embodiment of the invention.

In some embodiments, if desirable, the housing 12 can be designed to better interface or seal a particular diameter of cable 30. For example, concave housings 12 of FIG. 1 can be redesigned to include a set of one or more walls having one or more substantially arcuate channels 50 configured to receive a cable 30 having a substantially equal diameter as the arcuate channels 50. The arcuate channels 50 on the walls are typically located at the position on the circumferential perimeter 15 of the housing 12 where the cable 30 will be placed. Also, for example, as shown in FIG. 15 the set of one or more walls can be removable walls 52 capable of being removed from the concave housing 12 and replaced with a second set of one or more walls having one or more substantially arcuate channels 50 configured to receive one or more cables 30 having substantially equal diameters as the arcuate channels 50 of the second set of walls. FIG. 15b shows the housing 12 before installation of the removable walls 52, and FIG. 15c shows the housing 12 after installation of the removable walls 52.

Figure 16:
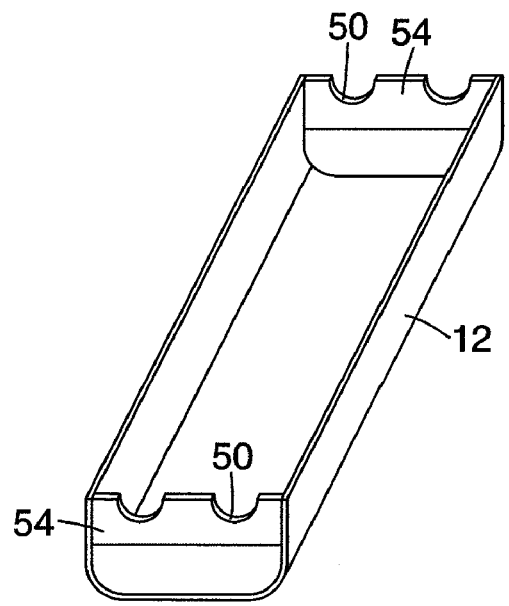
FIG. 16 is an isometric view of a housing after installation of adapter walls including arcuate channels according to an embodiment of the invention.

Also, for example, as shown in FIG. 16, the concave housings 12 can include a set of one or more removable adapter walls 54 positioned on a set of fixed walls on the circumferential perimeter 15 of each of the concave housings 12, where the adapter walls 54 can include one or more substantially arcuate channels 50 configured to receive a cable 30 having a substantially equal diameter as the arcuate channels 50.

Figure 6:
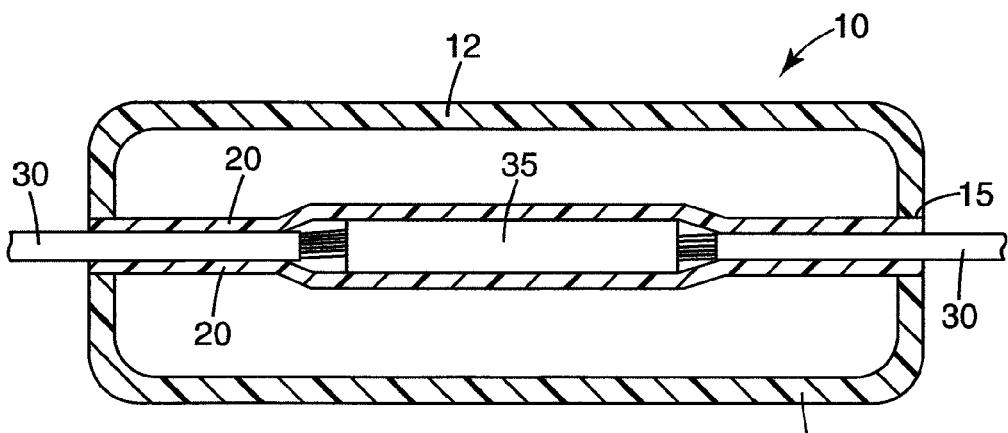
FIG. 6 is a sectional view of a closure housing taken along line 6-6 of FIG. 5 according to an embodiment of the invention.
Figure 11:
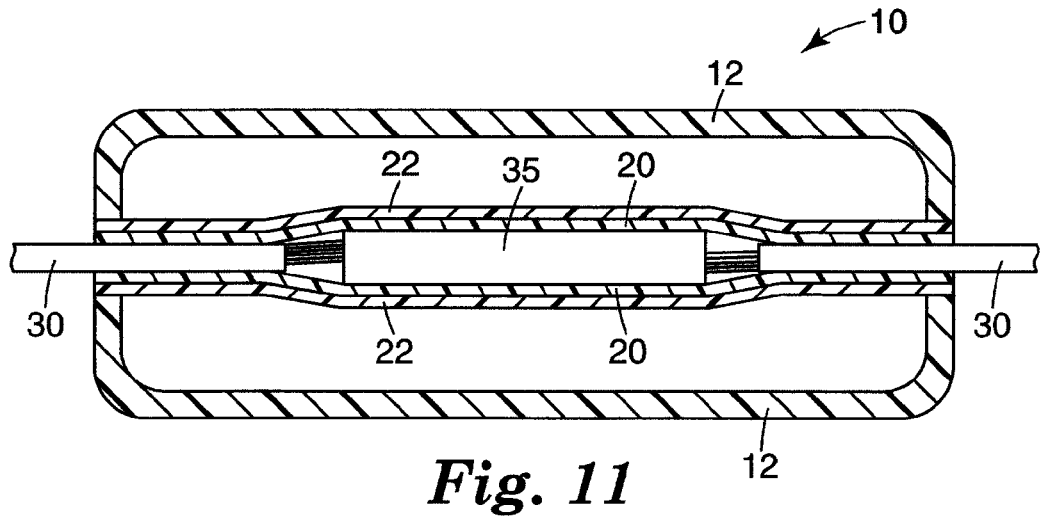
FIG. 11 is a sectional view of a closure housing taken along line 11-11 of FIG. 10 according to an embodiment of the invention.
Figure 12:
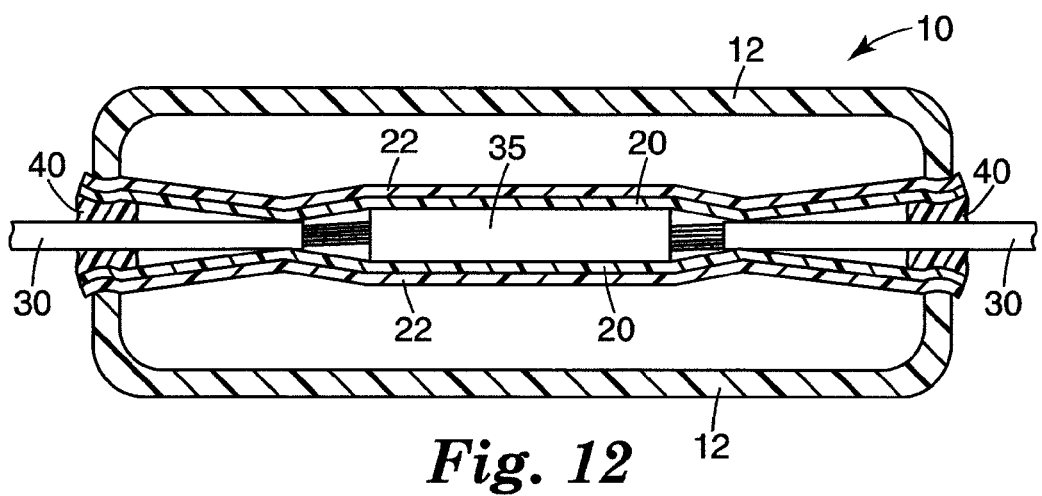
FIG. 12 is a sectional view of a closure housing including endseals according to an embodiment of the invention.
Figure 13:
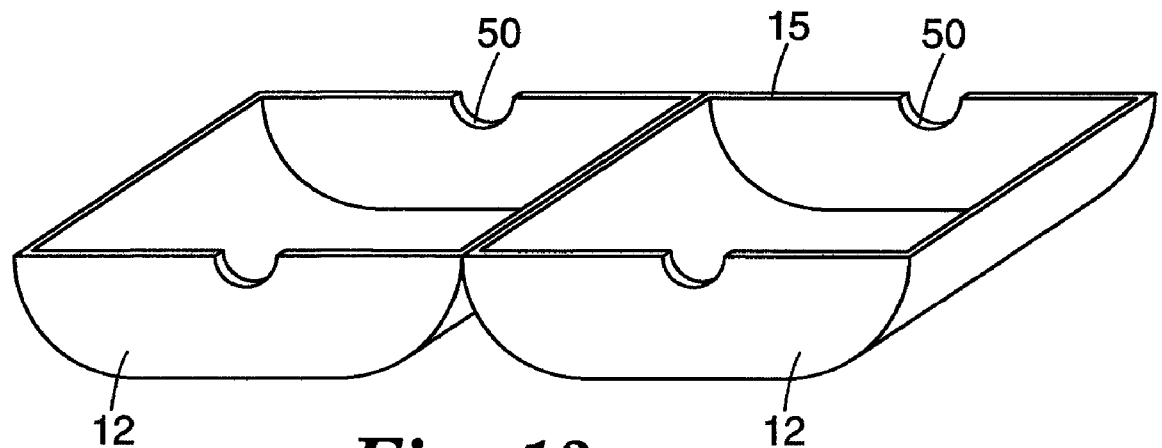
FIG. 13 is an isometric view of a closure housing including arcuate channels according to an embodiment of the invention.

As shown in the exemplary embodiments of FIGS. 6, 11, and 12, a volume of space can exist between the elastomeric film 20 mounted to one of the housings 12 and the elastomeric film 20 mounted to another of the housings 12 (between the cable and the joining component), whereby the volume of space is advantageously compliant to changes in air pressure. The space can advantageously allow the volume of the space to be compressed responsive to increases of the external pressure of the volume inside the concave housing 12 outside the elastomeric film 20.

As shown in FIG. 12, for example, a portion of the circumferential perimeter 15 of the open face of each of the housings 12 can include an endseal 40 of elastomeric material applied thereon. Also, for example, the endseal 40 of elastomeric material can alternatively be spirally wrapped or otherwise wrapped around the cable 30 to surround the cable 30 at a position on the cable 30 configured to align or to interface with a portion of the circumferential perimeter 15 of the open face of the housing 12. Also, for example, the endseal 40 could include a rubber gasket endseal 40, understood by those skilled in the art, having a split portion to fit over the cable 30, where the rubber gasket endseal 40 thereby forms a sealed interface with the cable 30.

The endseal 40 material, as understood by those skilled in the art, includes polymers and formulations including, for example, oils, plasticizers, and other polymeric materials, rubber tape with or without adhesive, vinyl tape, as well as materials that would be considered mastic. The endseal 40 material can also be the same material as used in the aforementioned elastomeric film 20.

In operation, the invention advantageously provides improved protection and watertight sealing of one or more cables 30 and/or joining components 35 from harmful environmental conditions in the communications industry (such as telecommunications industry), utilities industry (such as electrical utilities industry), or other industry involving the distribution of cables 30 and/or the transmission of optical light or electricity, seeking improved solutions regarding sealing solutions, re-enterability solutions, pressure condition solutions, space condition solutions, and weight condition solutions advantageously provided by the invention.

The inclusion of the elastomeric film 20, flexible layer 22, and/or conformable sealant 20, in combination with the hollow nature of the concave housing 12, advantageously provides a solution for a closure housing 10 that offers exceptional sealing, while at the same time providing a closure housing 10 that is re-enterable to an extent not provided in previous closure housings 10.

Further, the invention advantageously provides improved mechanical cable 30 stress and strain relief based on inevitable pressure changes during periods of operation. The relatively soft surface of the layers mounted to the housings 12 can deform to accommodate pressure changes, without putting undue stress on the outer perimeter of the housings 12. The compliance of the deformable layers mounted to the housings 12 allows for significant changes in the shape of the closure while maintaining a watertight seal. Because the volume protected from water is only marginally larger than the volume of the splice, and generally significantly smaller than the entire volume of the interior of the closure housing 10, the influence of pressure changes are advantageously minimized, as compared to rendering the entire volume of the closure housing 10 watertight.

Further, the hollow nature of the concave housing 12 advantageously provides increased room or space for the displacement of large cables 30 inside the closure housing 10. Further, the hollow nature of the concave housing 12 advantageously provides a lighter solution for a closure housing 10, and the decrease in weight importantly allows for easier installation and transport, as well as a reduction in cost associated with the manufacture of such a closure housing 10.

Although the aforementioned detailed description contains many specific details for purposes of illustration, anyone of ordinary skill in the art will appreciate that many variations, changes, substitutions, and alterations to the details are within the scope of the invention as claimed. Accordingly, the invention described in the detailed description is set forth without imposing any limitations on the claimed invention. The proper scope of the invention should be determined by the following claims and their appropriate legal equivalents.

The invention claimed is:
1. An apparatus comprising:
   a plurality of housings, at least one of which comprises a concave housing with an open face; and
   one or more elastomeric films, each elastomeric film mounted on a circumferential perimeter portion of the concave housings across the open face of each of the concave housings, wherein the elastomeric films are adapted to interface one or more cables when the cables are interposed between the housings to seal the cables from environmental conditions.

2. The apparatus as defined in claim 1, wherein two or more of the plurality of housings are concave housings with an open face, and wherein the open face of one of the concave housings faces and mates with the open face of another of the concave housings, thereby defining facing mated housings.

3. The apparatus as defined in claim 2, further comprising:
one or more cables, a first portion of each of the cables interposed between the elastomeric films and facing housings to seal the cables from environmental conditions, and a second portion of each of the cables extending outside of the elastomeric films and the facing housings.

4. The apparatus as defined in claim 3, wherein the one or more cables comprises two or more cables; and
further comprising a joining component that joins the cables, wherein a portion of the joining component interfaces a portion of at least one of the elastomeric films to seal the joining component from environmental conditions.

5. The apparatus as defined in claim 3, wherein each of the cables is configured along a direction substantially parallel to the plane of the open face of the concave housing.

6. The apparatus as defined in claim 3, further comprising an endseal of elastomeric material surrounding the cable at a position configured to align with a portion of the circumferential perimeter of the open face of the housing.

7. The apparatus as defined in claim 3, further comprising a rubber gasket endseal having a split portion to fit over the cable, the rubber gasket endseal thereby forming a sealed interface with the cable.

8. The apparatus as defined in claim 3, further comprising a volume of space between the elastomeric film mounted to one of the housings and the elastomeric film mounted to an adjacent housing, the volume of space being compliant to changes in air pressure.

9. The apparatus as defined in claim 3, further comprising one or more gas bladders positioned in a concave cavity of the concave housing.

10. The apparatus as defined in claim 3, wherein each of the concave housings comprises a set of one or more walls having one or more substantially arcuate channels configured to receive a cable having a substantially equal diameter as the arcuate channels.

11. The apparatus as defined in claim 10, wherein the walls comprise removable walls capable of being removed from the concave housing and replaced with a second set of one or more walls having one or more substantially arcuate channels configured to receive one or more cables having substantially equal diameters as the arcuate channels of the second set of walls.

12. The apparatus as defined in claim 1, wherein the volume between an inside wall of the concave housing and the elastomeric film is substantially free of filler material.

13. The apparatus as defined in claim 1, wherein at least a portion of the elastomeric film comprises a polymeric thermoplastic hydrophobic composition including at least a portion of oil.

14. The apparatus as defined in claim 13, wherein the portion of oil comprises about 50% to about 98% of the elastomeric film.

15. The apparatus as defined in claim 1, wherein at least a portion of the elastomeric film includes filler particles.

16. The apparatus as defined in claim 1, wherein at least a portion of the elastomeric film comprises an oil and a polymer selected from the group consisting of: a polyurethane, a polyester, a polystyrene, a polyepoxy, a polyacrylate, and a polyolefin.

17. The apparatus as defined in claim 1, wherein at least a portion of the elastomeric film comprises a copolymer of which a portion is selected from the group consisting of: a polyurethane, a polyester, a polystyrene, an epoxy, an acrylate, and a polyolefin.

18. The apparatus as defined in claim 1, further comprising:
one or more flexible layers, each flexible layer mounted on a circumferential perimeter portion of the concave housings across the open face of each of the concave housings, wherein each of the one or more elastomeric films cover a surface portion of each of the flexible layers.

19. The apparatus as defined in claim 18, further comprising a barb extending from the flexible layer, and further comprising a slot defined in the housing, wherein the barb is capable of being inserted through the slot.

20. The apparatus as defined in claim 18, wherein the volume between an inside wall of the concave housing and the flexible layer is substantially free of filler material.

21. The apparatus as defined in claim 18, wherein the flexible layer is capable of co-continuously interpenetrating with the elastomeric film.

22. An apparatus comprising:
a plurality of housings, at least one of which comprises a concave housing with an open face;
one or more flexible layers, each flexible layer mounted on a circumferential perimeter portion of the concave housings across the open face of each of the concave housings; and
one or more conformable sealants, each of the conformable sealants covering a surface portion of each of the flexible layers, wherein the conformable sealants are adapted to interface one or more cables when the cables are interposed between the housings to seal the cables from environmental conditions.

23. The apparatus as defined in claim 22, wherein two or more of the plurality of housings are concave housings with an open face, and wherein the open face of one of the concave housings faces and mates with the open face of another of the concave housings, thereby defining facing mated housings.

24. The apparatus as defined in claim 23, further comprising:
one or more cables, a first portion of each of the cables interposed between the conformable sealants and facing housings to seal the cables from environmental conditions, and a second portion of each of the cables extending outside of the conformable sealants and the facing housings.

25. The apparatus as defined in claim 24, wherein the one or more cables comprises two or more cables; and
further comprising a joining component that joins the cables, wherein a portion of the joining component interfaces a portion of at least one of the conformable sealants to seal the joining component from environmental conditions.

26. The apparatus as defined in claim 24, wherein each of the cables is configured along a direction substantially parallel to the plane of the open face of the concave housing.

27. The apparatus as defined in claim 24, further comprising an endseal of elastomeric material surrounding the cable at a position configured to interface with a portion of the circumferential perimeter of the open face of the housing.

28. The apparatus as defined in claim 24, further comprising a rubber gasket endseal having a split portion to fit over the cable, the rubber gasket endseal thereby forming a sealed interface with the cable.

29. The apparatus as defined in claim 24, further comprising one or more gas bladders positioned in a concave cavity of the concave housing.

30. The apparatus as defined in claim 24, wherein each of the concave housings comprises a set of one or more walls having one or more substantially arcuate channels configured to receive a cable having a substantially equal diameter as the arcuate channels.

31. The apparatus as defined in claim 30, wherein the walls comprise removable walls capable of being removed from the concave housing and replaced with a second set of one or more walls having one or more substantially arcuate channels configured to receive one or more cables having substantially equal diameters as the arcuate channels of the second set of walls.

32. The apparatus as defined in claim 22, wherein at least a portion of the conformable sealant comprises a thickener cooperating with at least a portion of oil.

33. The apparatus as defined in claim 32, wherein at least a portion of the thickener comprises a composition selected from the group consisting of: an organic polymeric composition, an inorganic sol composition, and a soap composition.

34. The apparatus as defined in claim 32, wherein at least a portion of the thickener is selected from the group consisting of: polyurethanes, polyesters, polyepoxys, polyacrylates, polyolefins, polysiloxanes, polybutadienes, hydrogenated polybutadienes, and hydrogenated polyisoprenes.

35. The apparatus as defined in claim 32, wherein at least a portion of the thickener is selected from the group consisting of: alumina, silica, and clay.

36. The apparatus as defined in claim 32, wherein at least a portion of the thickener is selected from the group consisting of: metal complex soaps, aluminum complex soaps, lithium complex soaps, and calcium complex soaps.

37. The apparatus as defined in claim 22, wherein at least a portion of the conformable sealant comprises a portion of oil, and wherein the portion of oil comprises about 50% to about 98% of the conformable sealant.

38. The apparatus as defined in claim 22, wherein at least a portion of the conformable sealant includes filler particles.

39. The apparatus as defined in claim 22, further comprising a barb extending from the flexible layer, and further comprising a slot defined in the housing, wherein the barb is capable of being inserted through the slot.

40. The apparatus as defined in claim 22, wherein the volume between an inside wall of the concave housing and the flexible layer is substantially free of filler material.

41. The apparatus as defined in claim 22, wherein the flexible layer is capable of co-continuously interpenetrating with the conformable sealant.

42. An apparatus comprising:
  two or more concave housings each having an open face, the open face of one of the housings facing and mating with the open face of an adjacent housing, thereby defining one or more facing mated housings;
  two or more flexible layers, each flexible layer mounted on a circumferential perimeter portion of the concave housings across the open face of each of the concave housings;
  two or more elastomeric films, each elastomeric film covering a surface portion of each of the flexible layers; and
  one or more cables, a first portion of each of the cables interposed between the elastomeric films and facing housings to seal the cables from environmental conditions, and a second portion of each of the cables extending outside of the elastomeric films and the facing housings.

43. An apparatus comprising:
  a plurality of housings, at least one of which comprises a concave housing with an open face; and
  one or more flexible layers, each flexible layer mounted on a circumferential perimeter portion of the concave housings across the open face of each of the concave housings, wherein the flexible layers are adapted to interface one or more cables when the cables are interposed between the housings to seal the cables from environmental conditions.

* * * * *